United States Patent [19]

Obssuth

[11] Patent Number: 4,614,413

[45] Date of Patent: Sep. 30, 1986

[54] CONTACT LENS

[76] Inventor: George A. Obssuth, 2430 Cleveland Ave., Washington Township, Warren County, N.J. 07675

[21] Appl. No.: 697,923

[22] Filed: Feb. 5, 1985

[51] Int. Cl.$^4$ .............................................. G02C 7/04
[52] U.S. Cl. .................................. 351/161; 351/160 R
[58] Field of Search ............... 351/160 H, 160 R, 161, 351/162

[56] References Cited

U.S. PATENT DOCUMENTS

| | | | |
|---|---|---|---|
| 2,129,305 | 9/1938 | Feinbloom | 351/160 R |
| 2,347,488 | 4/1944 | Lawlor et al. | 351/160 R |
| 3,102,157 | 8/1963 | Gamber | 351/161 |
| 3,211,810 | 10/1965 | Gamber | 351/160 R |
| 3,591,264 | 7/1971 | Forrest | 351/160 R |
| 3,794,414 | 2/1974 | Wesley | 351/161 |
| 4,324,461 | 4/1982 | Salvatori | 351/160 H |
| 4,332,443 | 6/1982 | Thomas | 351/160 H |

FOREIGN PATENT DOCUMENTS

1217230 12/1959 France ............................ 351/160 R

Primary Examiner—John K. Corbin
Assistant Examiner—Scott J. Sugarman
Attorney, Agent, or Firm—W. Patrick Quast

[57] ABSTRACT

A contact lens is provided having a substantially concavo-convex lenticular carrier. The carrier has a palpebral anchor portion which is shaped for seating between the conjunctiva of the lower eyelid and the inferior sclera of the eyeball, so that the carrier is held in place with respect to the lower eyelid by the muscles of the lower eyelid. The carrier also has an optical portion which projects upwardly from the anchor portion and which has a reading vision correction area which lies below the pupil of the eye when the wearer of the lens is looking straight ahead and substantially covers the pupil when the eye is moved to a reading position. The junction between the anchor portion and the optical portion extends substantially along the margin of the lower eyelid. The optical portion may consist solely of a reading vision correction area, so that the lens acts as a "half eye" lens, or may also include one or more distance vision correction areas, so that the lens acts as a true bifocal or trifocal lens.

21 Claims, 21 Drawing Figures

CONTACT LENS

BACKGROUND OF THE INVENTION

1. Field of the Invention

This invention relates to optical lenses for correcting vision defects and more particularly to an "anchored" contact lens for correction of presbyopia and other vision defects.

2. Description of the Prior Art

Prior art attempts to provide contact lenses for the correction of presbyopia have not been particularly successful. In presbyopic patients, the lens providing the "reading" or near vision correction must have positional stability relative to the lower eyelid, so that it will cover the pupil of the eye only when the eyeball is rotated downwardly to assume a reading position but will not cover the pupil when the eye assumes a straight ahead or distance vision position for which either no correction or only a distance correction is required.

The older type of contact lens, the so-called "scleral lens", provided a high degree of positional stability because it was supported and positioned by the scleral portion of the eyeball and was permitted little rotational or translational movement relative to the eye socket and lower eyelid. However, the inherent design of this lens presented many clinical difficulties during the fitting and wearing of the lens which eventually led to the development of the so-called "corneal lens" which essentially "floated" on the cornea of the eyeball. Although the corneal lens overcame many of the clinical problems associated with the scleral lens, it was not amenable to providing reading correction for presbyopic patients because of its floating or movable position on the cornea of the eye.

One attempt to provide reading or near vision correction in corneal lenses involved the use of a substantially circular lens in which the reading correction was provided by an annular portion which was concentrically disposed about a centrally located distance vision correction portion. This type of lens provided reading correction when the eyeball was rotated to a reading position in which the pupil was covered by the annular reading correction portion of the lens and permitted distance correction when the eyeball was rotated to a straight ahead position so that the central distance vision correction portion only covered the pupil. This arrangement was subject to many difficulties, however, because the lens was easily moved out of position on the cornea during the normal blinking action of the upper eyelid. The resulting translational or up and down movement of the lens obviously did not permit the positional stability required for satisfactory operation of the lens. Furthermore, the variously sized optic zones of these lenses produced "ghost" images, blurry vision and other defects.

Another prior art attempt to deal with presbyopia by means of corneal lenses involved the use of segmented lenses in which a distance vision correction portion or a non-vision correcting portion was arranged to cover the pupil with the eye in a straight ahead position. This lens had a reading vision correction portion which depended from the distance vision portion and which covered the pupil when the eye was rotated to a reading position. In this type of lens, problems were caused by both rotational and translational movements of the lens because of the segmental shape of the lens which required exact positional alignment for correct operation. In order to prevent rotation and translation of the lens relative to the cornea, this type of lens was provided with an outwardly or anteriorly projecting flange which engaged the margin of the lower eyelid to limit rotational movement and provide some degree of stability during blinking or other translational movements. The lens, however, still floated on the cornea and was not positionally stable. Other arrangements for preventing rotational movement of these lenses involved the use of a ballasted or weighted lens in which the heaviest and/or largest portion of the lens was disposed inferiorly of the distance correction portion so that the force of gravity tended to center the lens and prevent rotation. Unfortunately, all of these arrangements did not provide a satisfactory solution to the problem because of the wide range of lens movements which were still possible.

Still another attempt to provide presbyopic correction involved the use of a small non-contact lens having a reading correction which was cemented to the margin of the lower eyelid. This lens projected up from the lower eyelid margin and was spaced a distance from the eyeball so that when the eye was closed, the margin of the upper eyelid could pass between the lens and the eyeball to thereby permit the eye to be closed with the lens in position. Obviously, this type of lens was not a contact lens and provided some inconvenience to the wearer because of the necessity of adhesively mounting it on the margin of the lower eyelid.

SUMMARY OF THE INVENTION

It is an object of this invention to provide a contact lens for the correction of presbyopia and other vision disorders which makes use of the normal anatomical contour of the inferior eye socket to hold the lens in place.

It is a further object of this invention to provide a contact lens for the correction of presbyopia and other vision disorders having a unique anchor portion which is held firmly in the conjunctival sac of the lower eyelid by the muscles of the lower eyelid, so that unwanted movements of the lens are prevented.

It is a still further object of this invention to provide a contact lens of the half-eye type for reading correction which produces no ghosts, blurry vision or other vision defects and which is not subject to malfunctions caused by blinking or other eye movements.

It is an additional object of this invention to provide a contact lens for reading correction which is easily fitted on the patient and which may be stocked by the fitter in a limited range of prescriptions to thereby minimize the inventory of lenses which the fitter must carry.

It is another object of this invention to provide a contact lens for the correction of presbyopia and other vision disorders which is easy and relatively inexpensive to manufacture and which readily lends itself to fabrication by molding techniques.

It is an additional object of this invention to provide a contact lens for the correction of presbyopia and other vision disorders which is easily installed by the wearer of the lens and which is not subject to accidental dislodgement by normal eye movements.

Briefly, the contact lens of the invention comprises a substantially concavo-convex lenticular carrier having a palpebral anchor portion shaped for seating between the conjunctiva of the lower eyelid and the inferior sclera of the eyeball and an optical portion projecting upwardly from the anchor portion. The optical portion and the anchor portion are so proportioned that the junction between these portions extends substantially along the margin of the lower eyelid and the lens is held in place with respect to the lower eyelid by the muscles of the lower eyelid. The optical portion has a reading vision correction area which lies below the pupil of the eye when the wearer of the lens is looking straight ahead and substantially covers the pupil when the eye is rotated to a reading position. The anchor portion of the lens has a laterally-extending depression formed therein on the convex side thereof which is proportioned to receive the muscle of Riolan of the lower eyelid therein. In a preferred embodiment of the invention, the laterally-extending depression is a groove located just below the junction of the lens portions and the anchor portion has an anteriorly-projecting bulge on the convex side thereof extending along the lower edge thereof for seating in the conjunctival cul-de-sac of the lower eyelid and a laterally-extending band-shaped section on the convex side thereof joining the groove and the bulge. The band-shaped section is shaped to receive the tarsal plate of the lower eyelid, so that the lens is held in place with respect to the lower eyelid by both the muscle of Riolan and the palpebral orbicularis muscle.

When the reading vision correction area of the optical portion extends over substantially the entire optical portion, the lens provides only reading vision correction and functions as a "half eye" lens. If desired, however, the optical portion of the lens may also include one or more distance vision correction areas in addition to the reading vision correction area.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
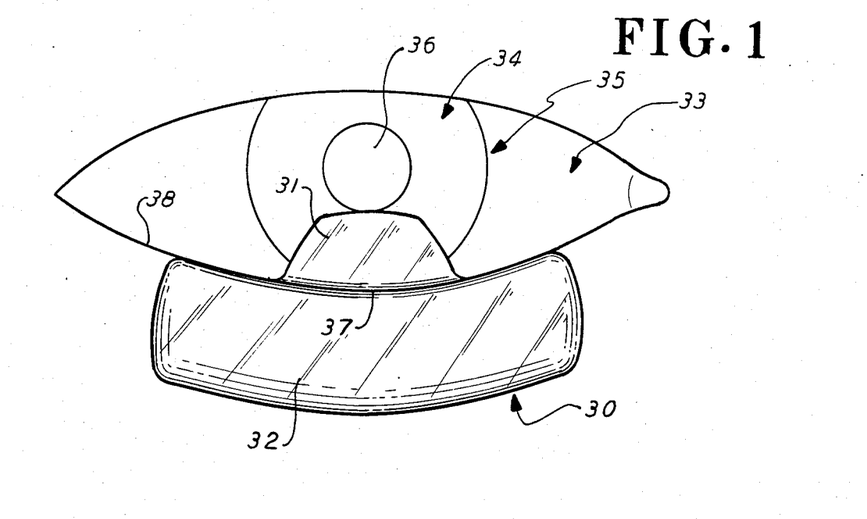
FIG. 1 is a front view of the human eye showing a contact lens constructed in accordance with the teachings of the present invention seated between the conjunctiva of the lower eyelid and the inferior sclera of the eyeball.

Referring now to FIG. 1 of the drawings, a contact lens constructed in accordance with the teachings of the present invention is shown in place in the eye of a wearer of the lens. The contact lens comprises a substantially concavo-convex lenticular carrier, indicated generally as 30, which has a vision-correcting or optical portion 31 and a non-vision correcting palpebral anchor portion 32. The eyeball has a scleral portion, indicated generally as 33, and a corneal portion, indicated generally as 34. The junction between the scleral and corneal portions of the eye is the substantially circular limbus, indicated generally as 35. The palpebral anchor portion 32 of the lens has a size and shape which permit it to be seated between the conjunctiva of the lower eyelid and the inferior or lower portion of the sclera of the eye. The optical portion 31 of the lens projects upwardly from the anchor portion and is of sufficient size to permit the pupil 36 of the eye to be substantially covered by the optical portion when the eyeball is rotated downwardly to a reading position. The optical portion and the anchor portion of the lens are so proportioned that the junction 37 between these portions extends substantially along the margin of the lower eyelid and the lens is held in place with respect to the lower eyelid by the muscles of the lower eyelid. When the eye is looking straight ahead, as shown in FIG. 1, the inferior or lowermost point of the limbus 35 is located at the margin 38 of the lower eyelid and hence at the junction 37 between the optical and anchor portions of the lens. The lens is so proportioned that the uppermost point or top of the optical portion 31 lies just below the pupil 36 of the eye with the eye in a straight ahead or distance vision position.

When the eye is rotated downwardly into a normal reading position, the cornea 34 rotates downwardly approximately 5½ millimeters while the margin 38 of the lower eyelid moves down only about 2½ millimeters. Accordingly, for optical correction of presbyopia, the reading portion of a corrective lens must sit just below the pupillary margin when the eye is in a straight ahead position and must remain still relative to the lower lid when the eye is rotated downwardly to the reading position. Since the diameter of an average pupil with a normal level of illumination is approximately 3 to 3½ millimeters and since the average movement of the cornea below the margin of the lower eyelid is approximately 3 millimeters with the eye in a reading position, it is apparent that the operation of a reading contact lens will only be satisfactory if the lens is held completely still with respect to the lower eyelid. In the lens of the invention, the anchor portion 30 lies below the margin 38 of the lower eyelid and is held in place with respect to the lower eyelid, as will be explained hereinafter, so that the lens moves downwardly with the lower eyelid when the eye is rotated to a reading position. This permits the pupil 36 of the eye to be substantially covered by the optical portion 31 of the lens. When the eye is looking straight ahead, the optical portion 31 of the lens lies just below the margin of the pupil 36 so that it will not interfere with the distance vision of the wearer of the lens.

Figures 4, 5, 6, 7, 8:
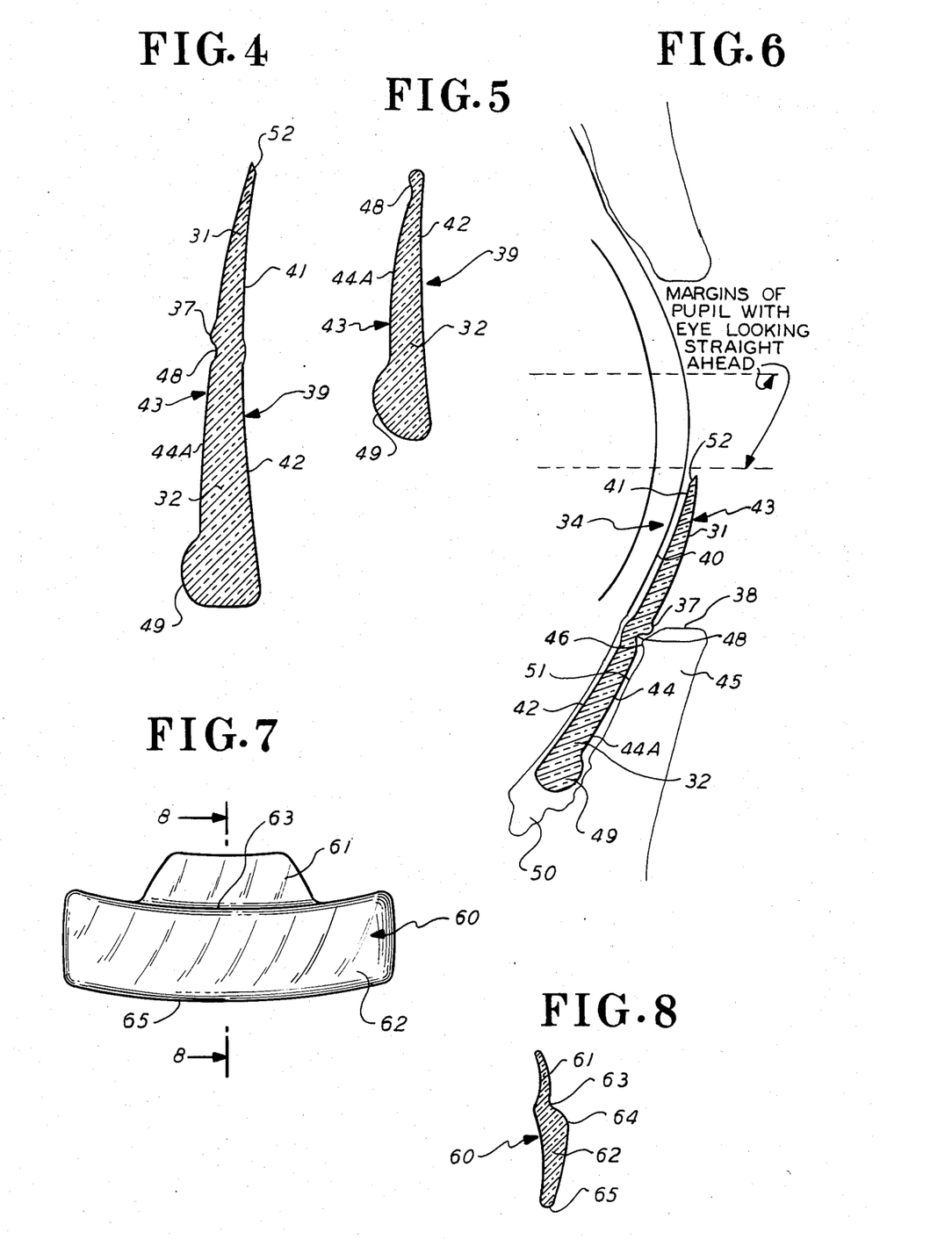
FIG. 4 is a full sectional view of the lens of FIG. 2 taken along the line 4—4 thereof.
FIG. 5 is a full sectional view of the lens of FIG. 2 taken along the line 5—5 thereof.
FIG. 6 is a vertical sectional view of an eye socket showing the contact lens of FIG. 2 seated in place.
FIG. 7 is a perspective view of a contact lens constructed in accordance with the present invention having an anchor portion with a differently shaped cross-section than the lens of FIGS. 1-6.
FIG. 8 is a full sectional view of the lens of FIG. 7 taken along the line 8—8 thereof.

A preferred configuration of the anchor portion of the contact lens of the invention is shown in detail in FIGS. 2 through 6 of the drawings. As seen therein, the lenticular carrier 30 has a generally concave posterior surface, indicated generally as 39, which substantially conforms to the shape of the anterior surface 40 of the eyeball. As seen in FIGS. 4 and 6, the surface 39 of the lens has a part 41 which substantially conforms to the radius of the corneal portion 34 of the eye and a part 42 which substantially conforms to the radius of the scleral portion 33 of the eye. The anterior or convex surface, indicated generally as 43, of the lens has a lower part 44 which is shaped to conform to the anatomical contours of the posterior surface of the lower eyelid 45. The lower eyelid 45 has an inwardly or posteriorly-projecting portion 46 which is produced by the laterally-extending muscle of Riolan which lies just below the upper margin 38 of the lower eyelid. In order to accomodate this portion, the convex surface of the anchor portion of the lens is provided with a laterally-extending depression 48. The depression is in the form of a groove which is located just below the junction 37 of the optical and anchor portions and which is proportioned to receive the muscle of Riolan therein. An anteriorly-projecting bulge 49 on the convex side of the anchor portion extends along the lower edge thereof for seating in the conjunctival cul-de-sac 50 of the lower eyelid. The groove 48 and the projecting bulge 49 on the convex side of the anchor portion are joined by a relatively smooth, laterally-extending band-shaped section 44A which is shaped to receive the tarsal plate 51 of the lower eyelid, so that the lens is held in place with respect to the lower eyelid by the palpebral orbicularis muscle which is located in the lower eyelid between the muscle of Riolan 46 and the conjunctival cul-de-sac 50. The blinking of the human eye is caused by a contraction of the orbicularis muscle. Since the palpebral orbicularis muscle is located anteriorly of the tarsal plate in the lower eyelid, the contact lens is anchored in place with respect to the lower eyelid by both the muscle of Riolan and the palpebral orbicularis muscle.

Figure 2:
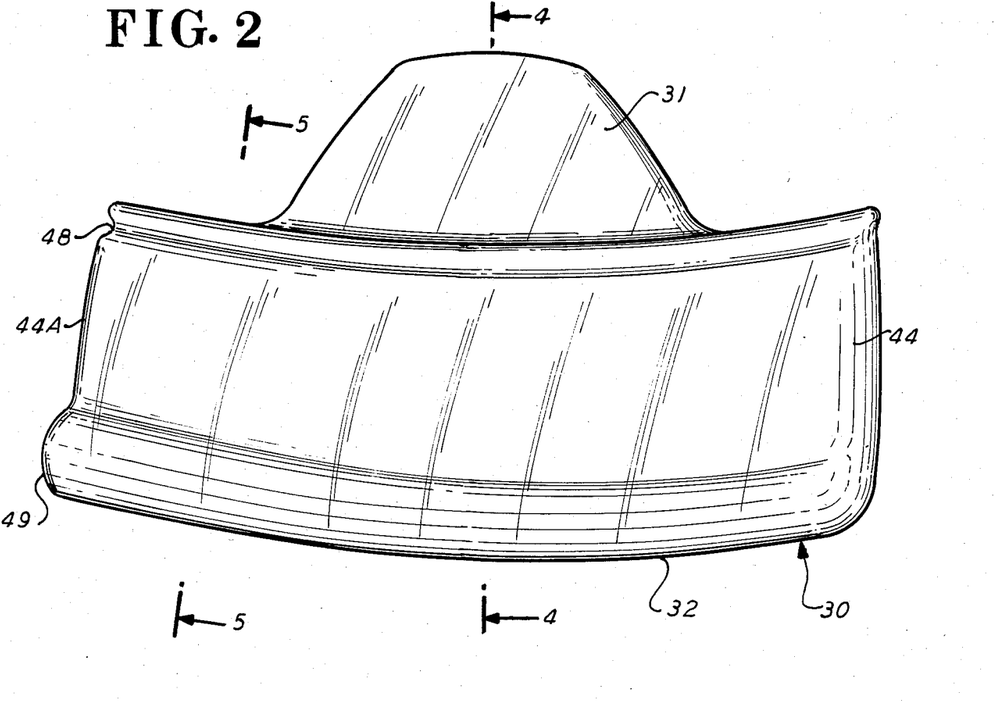
FIG. 2 is a perspective view of a preferred embodiment of the contact lens of FIG. 1.
Figure 3:
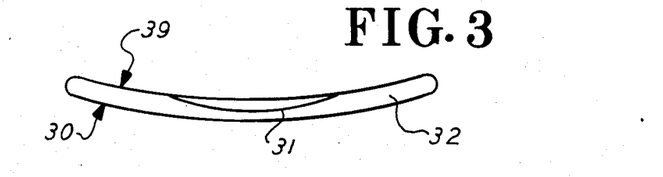
FIG. 3 is a top plan view of the lens of FIG. 2.

The foregoing configuration of the anchor portion of the carrier permits it to be held firmly in place with respect to the lower eyelid when the eyeball is rotated in any direction. The lens is forced against the eyeball by the palpebral orbicularis muscle and the muscle of Riolan. The groove 48 and the bulge 49 on the anchor portion of the lens prevent both upward and downward translatory movement of the lens as well as rotational movement. An anteriorly-extending taper or bevel 52 is provided on the concave side of the optical portion 31 of the lens along the upper edge thereof to prevent scratching or irritation of the eyeball by the upper edge of the lens. In this embodiment of the invention, a reading vision correction area extends over the entire optical portion 31 so that the lens functions in the manner of "half eye" eyeglasses to provide reading vision correction only. Approximate dimensions of the contact lens shown in FIGS. 2 through 6 of the drawings are shown in FIGS. 2 and 4. It will be understood, however, that a range of dimensions will be required to accomodate the range of wearer eye dimensions encountered in practice.

Figure 9:
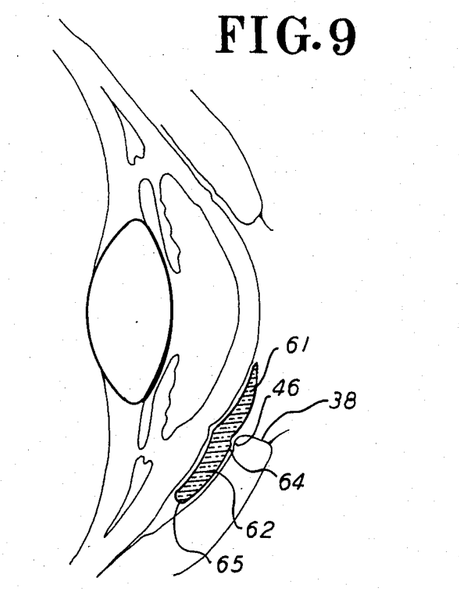
FIG. 9 is a vertical sectional view of an eye socket showing the lens of FIG. 7 seated in place therein.

A contact lens constructed in accordance with the present invention and having a somewhat different anchor portion is shown in FIGS. 7 through 9 of the drawings. As seen therein, this lens, indicated generally as 60, is provided with an optical portion 61 and a palpebral anchor portion 62. In this configuration, as seen in FIG. 8, the thickness of the anchor portion 62 of the lens increases sharply from the junction line 63 between the optical and anchor portions until it reaches a maximum at a point 64 which is somewhat below the muscle of Riolan. The thickness then continually decreases until it reaches the inferior or lower edge 65 of the lens. The convex surfaces of the optical and anchor portions of the lens have different radii of curvature and the difference in the radii of curvature forms a laterally-extending depression which extends substantially along the junction 63 of the lens portions. The depression thus formed accomodates the muscle of Riolan and the margin 38 of the lower eyelid as seen in FIG. 9. In this configuration, the anteriorly-projecting bulge 49 shown in the embodiment of FIGS. 2 through 6 of the drawings is eliminated as is the sharply defined groove 48. Accordingly, the anchor portion 62 has a vertical cross-section shaped substantially as an inverted tear drop with the apex of the tear drop located at the lower edge 65 of the anchor portion. Since the muscle of Riolan and the margin of the lower eyelid are above the point 64 of greatest thickness, the lens is still well anchored in place and translational and rotational movement are prevented.

Figure 10:
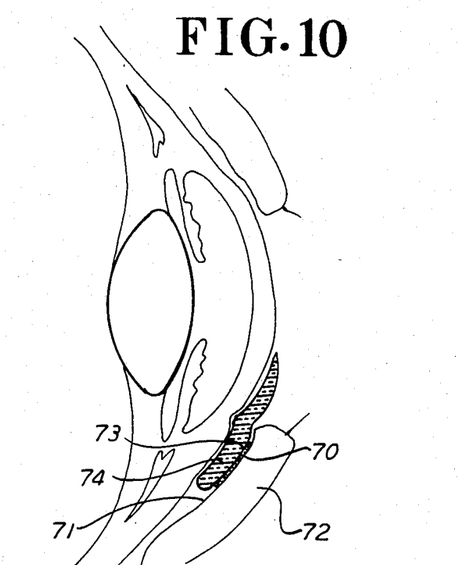
FIG. 10 is a vertical sectional view of an eye socket with the lens of FIG. 7 seated therein and with a biological adhesive applied to provide additional positional stability.

Although the anchor portions of the contact lenses hereinbefore described provide excellent anchoring and positional stability for the lenses for the vast majority of wearers, the contours of the conjunctival sac of the lower eyelid of some wearers may require additional measures such as the use of a biological adhesive between the conjunctiva of the lower eyelid and the anterior or convex surface of the anchor portion of the contact lens. As seen in FIG. 10, a layer 70 of a suitable biological adhesive is applied between the conjunctival surface 71 of the lower eyelid 72 and the anterior surface 73 of the anchor portion 74 of the lens. For purposes of illustration, the thickness of the layer 70 of adhesive has been greatly exaggerated. Biological adhesives suitable for this purpose are well known in the art and are often used for other purposes, such as the affixation of false eyelashes, for example.

Figure 11:
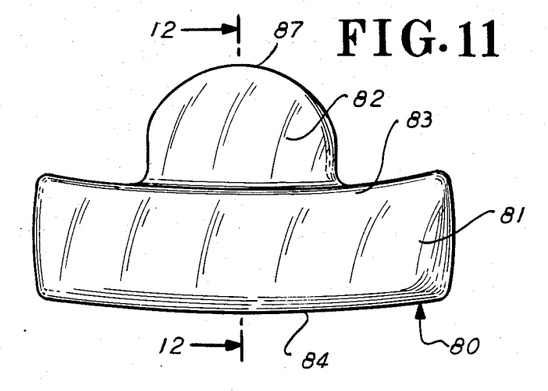
FIG. 11 is a perspective view of a contact lens constructed in accordance with the present invention having an anchor portion with a muscle receiving groove similar to the lens of FIGS. 1-6 but with a tear drop shaped vertical cross-section.
Figure 12:
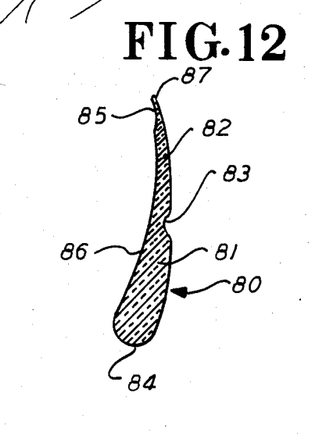
FIG. 12 is a full sectional view of the contact lens of FIG. 11 taken along the line 12—12 thereof.

FIGS. 11 and 12 of the drawings show a contact lens, indicated generally as 80, having a still different configuration of the anchor portion of the lens. As seen therein, the lens has an anchor portion 81 and an optical portion 82. The anchor portion 81 has a laterally-extending groove 83 which is located just below the junction of the lens portions in the same manner as the groove 48 in the lens of FIGS. 1-6. This groove also accomodates the muscle of Riolan. The anchor portion 81, however, gradually increases in thickness from the groove 83 towards its inferior or lower edge 84 which is suitably rounded to fit easily into the conjunctival cul-de-sac of the lower eye, so that the anchor portion has a vertical cross-section shaped substantially as a tear drop with the apex of the tear drop located at the groove 83. This anchor portion configuration also eliminates the anteriorly-projecting bulge 49 of the embodiment of FIGS. 2-6 of the drawings and still provides sufficient anchoring and positional stability for the lens. The optical portion 82 of this lens is also provided with a bevelled or tapered portion 85 on the posterior or concave surface 86 of the lens which extends along the upper edge 87 to prevent eye irritation. The bevelling is accomplished by the use of different radii of curvature for the bevelled portion 85 and the remainder of the posterior surface 86 of the lens.

Figure 13:
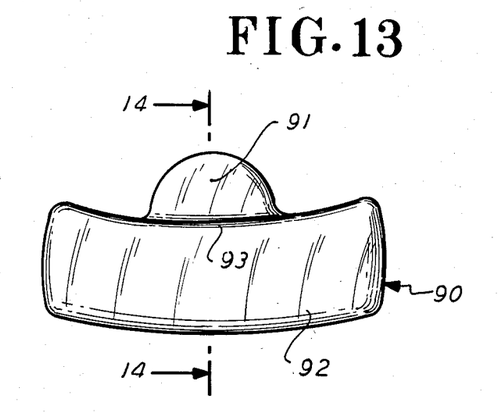
FIG. 13 is a perspective view of a contact lens constructed in accordance with the teachings of the invention wherein the lenticular carrier has a vertical cross-section through the optical and anchor portions shaped substantially as an elongated tear drop.
Figure 14:
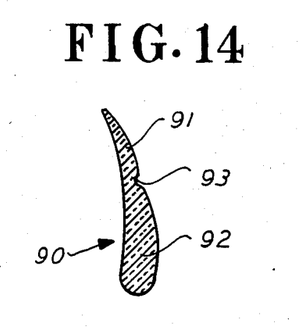
FIG. 14 is a full sectional view of the lens of FIG. 13 taken along the line 14—14 thereof.

In FIGS. 13 and 14 of the drawings, a variation in the overall cross-section of the contact lens is shown. As seen therein, the lens, indicated generally as 90, has a vertical cross-section through the optical and anchor portions which is shaped substantially as an elongated teardrop with the apex of the teardrop located at the upper edge of the optical portion. The optical portion 91 and the anchor portion 92 are separated by only a small or shallow laterally-extending depression 93 which is formed by the difference in radii of curvature of the convex surfaces of the lens. The laterally-extending depression 93 which is similar to the depression 63 in the lens of FIGS. 7-9, substantially bifurcates the convex surface of the lenticular carrier. Although this configuration of lens does not provide the same high degree of positional stability as the previously described anchor configurations, it may be useful for some lens wearers, particularly when used with a biological adhesive such as shown in FIG. 10 of the drawings.

Figures 15, 16, 17, 18:
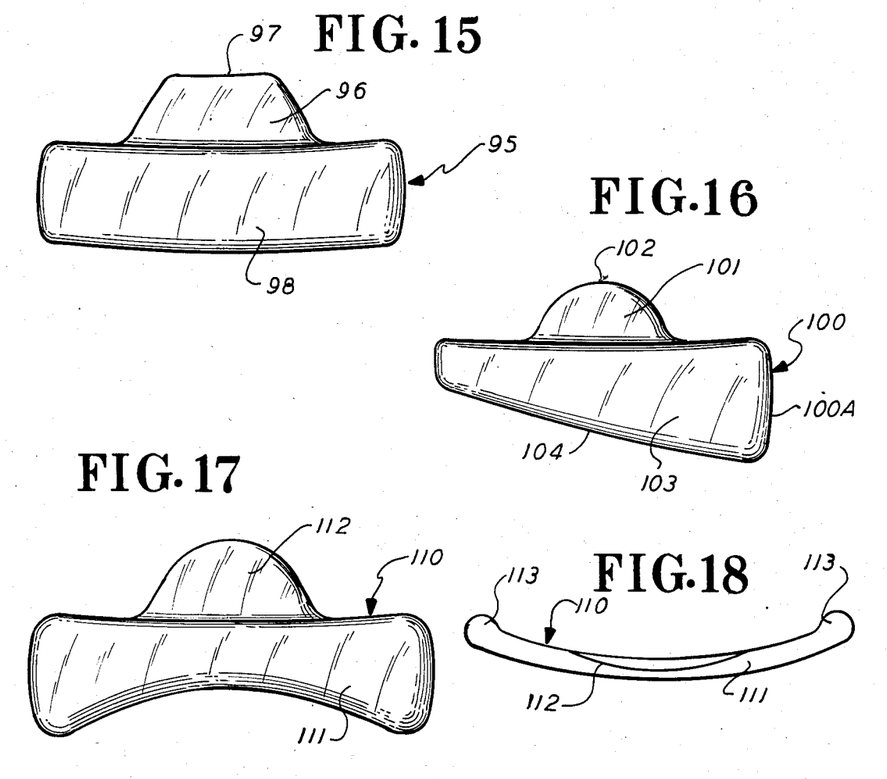
FIGS. 15 and 16 are perspective views of contact lenses constructed in accordance with the present invention having anchor portions with different overall shapes.
FIG. 17 is a perspective view of a contact lens constructed in accordance with the present invention which is especially suited for use by wearers having flaccid muscles in the lower eyelid.
FIG. 18 is a top plan view of the contact lens of FIG. 17.

As thus far described, it is apparent that the cross-section of the anchor portion of the contact lens of the invention may comprise several different configurations. However, as seen in FIGS. 15 and 16, the overall shape of the anchor portion and the overall shape of the optical portion of the lens may also be varied for particular purposes. For example, the lens, indicated generally as 95, shown in FIG. 15 has an optical portion 96 which has a relatively flat or straight upper edge 97. Furthermore, the anchor portion 98 of this lens has a substantially rectangular overall shape which readily lends itself to simple fabrication techniques. In FIG. 16, the lens, indicated generally as 100, has an optical portion 101 with a substantially semicircular upper edge 102. The anchor portion 103 of this lens has one end 100A thereof which is longer than the other end 100B thereof and a lower edge 104 which is skewed with respect to the horizontal, so that the anchor portion has an overall shape which is substantially that of a truncated triangle. This provides additional positional stability and thereby prevents the lens fron rotating up and out from under the lower eyelid. A lens for the other eye of the wearer would be a mirror image of this lens.

The lens shown in FIGS. 17 and 18 of the drawings provides additional positional stability to facilitate use by elderly wearers having relatively flaccid muscles of Riolan and orbicularis muscles. This lens, indicated generally as 110, has an anchor portion 111 and an optical portion 112. The anchor portion 111 has vertical cross-sections at the ends 113 thereof which are thicker than the vertical cross-section at the middle thereof, so that additional positional stability is provided which prevents the lens from rotating with respect to the lower eyelid.

It is believed apparent from the foregoing description that different combinations of the aforedescribed optical and anchor portions may be employed to suit a particular wearer or to provide a desired manufacturing objective. It is also apparent that each of the foregoing lenses provides a reading correction contact lens which provides excellent positional stability and which does not interfere with the normal distance vision of the wearer. Furthermore, the aforedescribed reading contact lens of the invention does not suffer from the previously described problems encountered by prior art lenses such as ghosts, blurry vision and unwanted rotational and translational movements. Since the optical reading portion of the lens is supported by a non-vision correcting anchor portion which is disposed between the lower eyelid and the eye, a light-transmitting anchor portion need not be employed as required in some of the described prior art lenses. A practicioner who fits these lenses need only carry a limited range of reading correction prescriptions since the anchor portion will fit most of the patients encountered in normal practice. This greatly facilitates patient treatment because the practicioner need carry only a small inventory of lenses to provide a correct prescription for the patient which accordingly permits the lens to be fitted on a first office visit. Additionally, manufacturing costs are also reduced because of the reduction in range of prescriptions that must be made by the manufacturer. The contact lens of the invention may be fabricated from any of the soft, pliable, transparent materials, such as a hemaplastic material, for example, which are in use today for the floating or corneal type of contact lens. Similarly, if the patient can tolerate a harder material, the lens of the invention may be made of the older, harder and less pliable materials.

Figure 19:
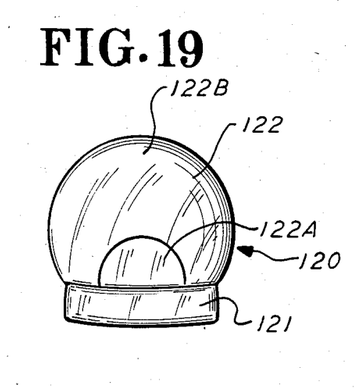
FIG. 19 is a perspective view of a contact lens constructed in accordance with the present invention which provides both reading and distance vision correction areas in the optical portion thereof.

Although the contact lens of the invention has been developed primarily for correction of presbyopia in patients who do not require a distance vision correction, it is possible to incorporate both presbyopic and myopic or hyperopic correction in a single contact lens constructed in accordance with the invention. As seen in FIG. 19 of the drawings, a contact lens, indicated generally as 120, is provided with an anchor portion 121 which may be constructed as hereinbefore described. The optical portion 122 of the lens, however, has not only a reading vision correction area 122A which may be shaped and proportioned in the same manner as the optical portions of the hereinbefore described lenses, but also a distance vision correction area 122B. The distance vision correction area is so sized and shaped as to substantially cover the pupil of the eye when the wearer of the lens is looking straight ahead and to lie above the pupil when the eye is rotated to a reading position, so that distance vision correction is provided for all normal positions of the eye except the downward or reading position. The lenticular carrier is provided with the concavo-convex configuration utilized in the previously described embodiments of the invention.

Figures 20, 21:
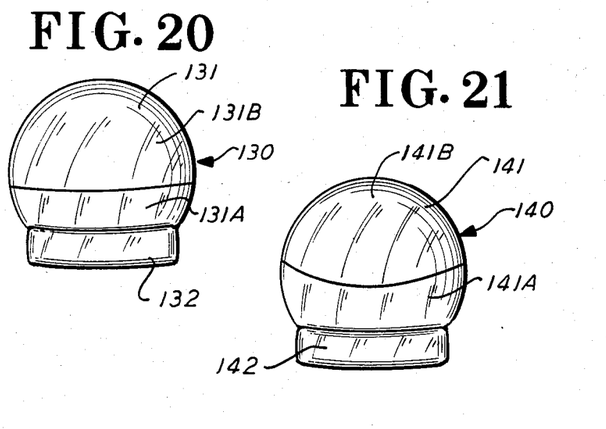
FIGS. 20 and 21 are perspective views of contact lenses which are similar to the lens of FIG. 19 but which have differently shaped reading and distance vision correction areas in the optical portions thereof.

Contact lenses having the same reading and distance vision corrections as the lens of FIG. 19 but with differently shaped optical areas are shown in FIGS. 20 and 21. The lens, indicated generally as 130, shown in FIG. 20 has an optical portion 131 having a reading vision correction area 131A which is a segmental band-shaped area separating the distance vision correction area 131B and the anchor portion 132 of the lens. In FIG. 21, the lens, indicated generally as 140, has an optical portion 141 having a reading vision correction area 141A and a distance vision correction area 141B thereon. The reading correction area 141A of the optical portion 141 is substantially crescent-shaped and separates the distance vision area 141B from the anchor portion 142 of the lens. This arrangement will provide reading or near vision correction over a somewhat wider visual field than the lens configurations shown in FIGS. 19 and 20 and may be suitable for tasks requiring the wider area of reading correction. The anchor portion 142 of the lens 140 may be shaped and sized as hereinbefore described. It is obvious that the optical portions of any of the lenses shown in FIGS. 19, 20 and 21 may include not only reading vision correction and distance vision correction but also intermediate vision correction, so that the lens acts as a trifocal lens.

It is believed apparent that many changes could be made in the construction and described uses of the foregoing contact lens and many seemingly different embodiments of the invention could be constructed without departing from the scope thereof. Accordingly, it is intended that all matter contained in the above description or shown in the accompanying drawings shall be interpreted as illustrative and not in a limiting sense.

What is claimed is:

1. A contact lens comprising a substantially concavo-convex lenticular carrier having
    a palpebral anchor portion shaped for seating between the conjunctiva of the lower eyelid and the inferior sclera of the eyeball, and
    an optical portion projecting upwardly from said anchor portion, said optical portion and said anchor portion being so proportioned that the junction between said portions extends substantially along the margin of the lower eyelid and the lens is held in place with respect to the lower eyelid by the muscles of the lower eyelid,
    said anchor portion of said lens has a laterally-extending depression formed therein on the convex side thereof, said depression being proportional to receive the muscle of Riolan of the lower eyelid therein.

2. A contact lens as claimed in claim 1 wherein said optical portion of said lens has a reading vision correction area which lies below the pupil of the eye when the wearer of the lens is looking straight ahead and substantially covers the pupil when the eye is rotated to a reading position.

3. A contact lens as claimed in claim 2 wherein said laterally-extending depression is a groove located just below said junction of said lens portions.

4. A contact lens as claimed in claim 3 wherein said anchor portion of said lens has
    an anteriorly-projecting bulge on the convex side thereof extending along the lower edge thereof for seating in the conjunctival cul-de-sac of the lower eyelid, and
    a laterally-extending band-shaped section on the convex side thereof joining said groove and said bulge, said band-shaped section being shaped to receive the tarsal plate of the lower eyelid, so that the lens is held in place with respect to the lower eyelid by the muscle of Riolan and the palpebral orbicularis muscle.

5. A contact lens as claimed in claim 4 wherein
    said reading vision correction area of said optical portion of the lens extends over substantially the entire optical portion, and
    the surface area of said optical portion is much smaller than the surface area of said anchor portion of the lens.

6. A contact lens as claimed in claim 5 wherein an anteriorly-extending taper is provided on the concave side of said optical portion of the lens along the upper edge thereof to prevent irritation of the eye.

7. A contact lens as claimed in claim 2 wherein
    the convex surfaces of said optical and anchor portions of the lens have different radii of curvature and
    said laterally-extending depression is formed by the difference in said radii of curvature, so that said depression extends substantially along said junction of said lens portions.

8. A contact lens as claimed in claim 7 wherein said anchor portion of the lens has a vertical cross-section shaped substantially as an inverted tear drop with the apex of the tear drop located at said lower edge of said anchor portion.

9. A contact lens as claimed in claim 7 wherein
    said lenticular carrier has a vertical cross-section through said optical and anchor portions shaped substantially as an elongated tear drop with the apex of the tear drop located at the upper edge of said optical portion and
    the convex surface of said carrier is bifurcated by said laterally-extending depression.

10. A contact lens as claimed in claim 2 further comprising
    a layer of biological adhesive on the convex surface of said anchor portion of the lens for securing said anchor portion to the conjunctiva of the lower eyelid to provide additional positional stability for the lens with respect to the lower eyelid.

11. A contact lens as claimed in claim 3 wherein said anchor portion of the lens has a vertical cross-section shaped substantially as a tear drop with the apex of the tear drop located at said groove.

12. A contact lens as claimed in claim 2 wherein said anchor portion has vertical cross-sections at the ends thereof which are thicker than the vertical cross-section at the middle thereof, so that additional positional stability is provided for the lens with respect to the lower eyelid.

13. A contact lens as claimed in claim 2 wherein said anchor portion has
    one end thereof which is longer than the other end thereof, and
    a lower edge thereof which is skewed with respect to the horizontal, so that said anchor portion has an overall shape which is substantially that of a truncated triangle.

14. A contact lens as claimed in claim 2 wherein said anchor portion has a substantially rectangular overall shape to facilitate fabrication of the lens.

15. A contact lens as claimed in claim 2 wherein said optical portion of the lens has a distance vision correction area which substantially covers the pupil of the eye when the wearer of the lens is looking straight ahead and lies above the pupil when the eye is rotated to a reading position.

16. A contact lens as claimed in claim 15 wherein said reading vision correction area of said optical portion of the lens is substantially semicircular in shape.

17. A contact lens as claimed in claim 15 wherein said reading vision correction area of said optical portion of the lens is a segmental band-shaped area on said optical portion and separates said distance vision correction area of said optical portion from said anchor portion.

18. A contact lens as claimed in claim 15 wherein said reading vision correction area of said optical portion of the lens is substantially crescent-shaped and separates said distance vision correction area of said optical portion from said anchor portion.

19. A contact lens comprising
   a substantially concavo-convex lenticular carrier having
   a laterally-extending depression on the convex side thereof, said depression being of a size and shape to receive the muscle of Riolan of the lower eyelid therein,
   an optical portion located on one side of said laterally-extending depression, said optical portion having a reading vision correction area of such size and shape as to lie below the pupil of the eye when the wearer of the lens is looking straight ahead and to substantially cover the pupil when the eye is rotated to a reading position, and
   a palpebral anchor portion depending from said optical portion, said anchor portion being of such size and shape as to be seated between the conjunctiva of the lower eyelid and the inferior sclera of the eyeball.

20. A contact lens as claimed in claim 19 wherein said optical portion of the lens also has at least one distance vision correction area of such size and shape as to lie above the pupil of the eye when the eye is in a reading position and to substantially cover the pupil when the eye is rotated to a non-reading position.

21. A contact lens as claimed in claim 19 wherein said reading vision correction area of the optical portion of the lens covers the entire area of said optical portion.

* * * * *